(12) United States Patent
Schulman

(10) Patent No.: US 6,561,437 B1
(45) Date of Patent: May 13, 2003

(54) WATER AND FERTILIZER DISPENSER

(76) Inventor: Alan M. Schulman, 3 Foxtail Ln., Riverwoods, IL (US) 60015

( * ) Notice: Subject to any disclaimer, the term of this patent is extended or adjusted under 35 U.S.C. 154(b) by 0 days.

(21) Appl. No.: 09/769,584

(22) Filed: Jan. 25, 2001

(51) Int. Cl.$^7$ .......................... A62C 13/62; A62C 5/02; B05B 7/26
(52) U.S. Cl. ...................... 239/316; 239/302; 239/303; 239/304; 239/308; 239/310
(58) Field of Search .................. 239/302, 303, 239/304, 308, 310, 311, 316, 375, 307, 315, 376, 377, 306; 220/23.4, 23.8, 23.83, 23.86; 141/22–27, 94; 222/386.5, 389, 158, 340, 143, 133, 148, 192, 130, 453, 295

(56) References Cited

U.S. PATENT DOCUMENTS

| | | | |
|---|---|---|---|
| 2,113,985 A | * 4/1938 | Hettinger | 239/303 |
| 3,085,752 A | * 4/1963 | Drell | 239/303 |
| 3,262,609 A | * 7/1966 | Poitras | 239/308 |
| 3,648,933 A | * 3/1972 | Grotz | 239/377 |
| 4,621,770 A | * 11/1986 | Sayen | 239/304 |
| 4,925,066 A | * 5/1990 | Rosenbaum | 222/192 |
| 4,932,563 A | * 6/1990 | Diamond et al. | 222/129 |
| 5,065,875 A | * 11/1991 | Balavich | 215/10 |
| 5,123,460 A | * 6/1992 | Reed | 141/95 |
| 5,432,146 A | * 7/1995 | Winston | 504/101 |
| 5,779,154 A | * 7/1998 | Martin | 239/315 |
| 6,021,896 A | * 2/2000 | Marshall | 206/315.9 |
| 6,305,175 B1 | * 10/2001 | Searle et al. | 62/62 |

* cited by examiner

Primary Examiner—Michael Mar
Assistant Examiner—Davis Hwu
(74) Attorney, Agent, or Firm—Jenkens & Gilchrist

(57) ABSTRACT

A water and fertilizer dispenser includes a hollow watering container forming a side cavity for holding a fertilizer container that fits into the side cavity and carries a fertilizer composition to be mixed with each new batch of water carried by the watering container. The fertilizer composition is a viscous aqueous composition that clings to a serrated stem on the cap of the fertilizer container, for self-measuring dispensing of the fertilizer composition. A removable sprinkler head for the watering container is stored in a receptacle formed as an integral part of the watering container.

16 Claims, 2 Drawing Sheets

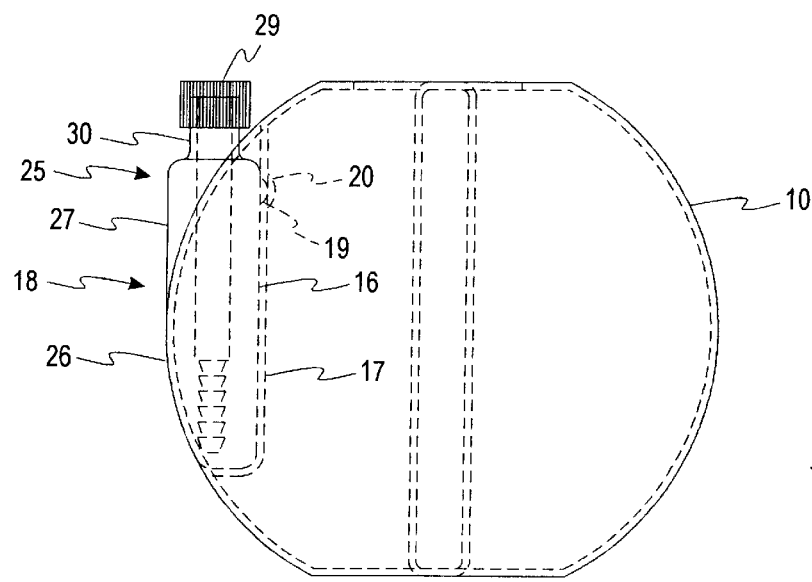
*FIG. 3*
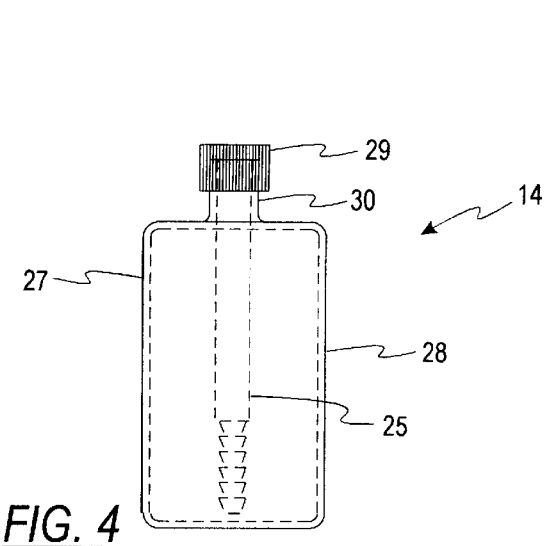
*FIG. 4*
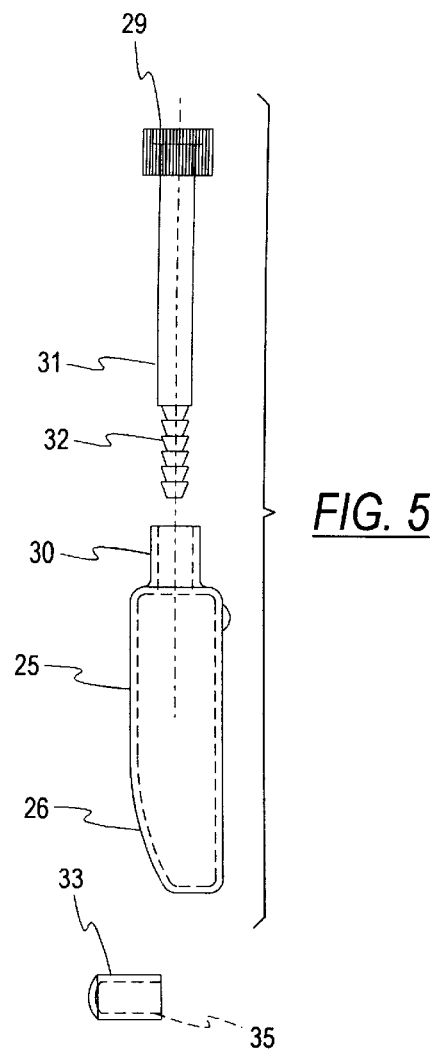
*FIG. 5*
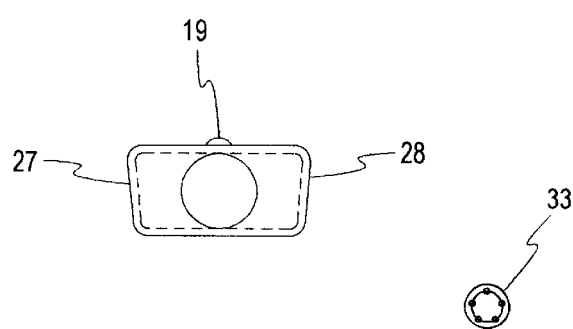
*FIG. 6*
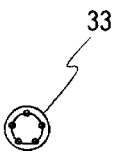
*FIG. 8*   *FIG. 7*

WATER AND FERTILIZER DISPENSER

FIELD OF INVENTION

The present invention relates to watering containers for plants. Specifically the present invention relates to a watering container that has a built-in cavity that will house an appropriately sized, self-proportioning container of plant fertilizer, or other materials beneficial to the growth of plants. To further assist the user, there is an easy grip handle and a built-in holder for retaining an optional sprinkler head.

BACKGROUND OF THE INVENTION

For best results when watering plants, it is generally recommended that a proper amount of fertilizer or other types of materials beneficial to plants be added to the water. While there are many forms of fertilizer and other materials available that can be added to the water, all of these are typically contained in a separate container (a bottle, package, etc.). Because these containers are not attached to the watering container, the appropriate container(s) must be located, the proper amount of fertilizer measured and mixed into the water, and then the container(s) returned to its storage location. Because of these necessary extra steps, many gardeners do not use fertilizer regularly, over feed, or do not fertilize at all. The lack of proper feeding and treating reduces the success of the plant's desired growth. Therefore, a need exists for a watering container that has a cavity built-into the design that will hold a separate container of fertilizer or other materials. With the fertilizer or materials readily at hand on the watering container, the gardener can easily dispense them, thus improving the desired growth of the plants being grown. The fertilizer container preferably includes a self-measuring dispenser.

In addition, the watering container has a specially designed handle that will allow the user to comfortably place a hand and fingers around the watering container, thus allowing easier pouring. This design will allow users with impaired use of the wrist to pour with a simple movement of the arm.

Because there are times when the desired mode of watering is via a wide sprinkler pattern rather than a direct stream of water, the watering container of the present invention may include a sprinkler head that can be applied to the watering container spout. Many times this type of sprinkler head is misplaced once it is removed from the spout. To eliminate this problem, the present invention has another storage cavity with a protrusion inside that will securely hold the sprinkler head when it is not in use.

SUMMARY OF THE INVENTION

The present invention provides a watering container that has an integral cavity that accommodates a mating fertilizer container. In addition to fertilizer, which is food for the plant, other materials beneficial to plants include but are not limited to pesticides, leaf cleaners, pest repellents, growth retardant and vitamins. The fertilizer container preferably includes a self-measuring dispensing system that works in conjunction with a viscous fertilizer composition, which is preferably an aqueous fertilizer composition containing xanthan gum, a versatile polysaccharide, as a thickener and stabilizer.

In addition, the watering container has a specially designed handle that will allow the user to comfortably place a hand and fingers around the watering container, thus allowing for easier pouring. This design will allow users with impaired use of the wrist to pour with a simple movement of the arm.

While the preferred embodiment is a small hand-held watering container with a proportionately sized fertilizer container, the principles of the present invention may be applied to various sizes of watering containers by increasing the sizes of the two containers proportionately. By increasing the volume of both the watering container and the fertilizer container, the total volume of the two containers is thereby increased proportionally.

The object of the invention is to provide the users with the means to easily and regularly fertilize and treat their plants. Through the creation of the present invention, the user may accomplish these goals through the use of a watering container that includes a removable fertilizer container built into the design, thus providing the user with an easier method for the application of plant fertilizer and other materials.

BRIEF DESCRIPTION OF THE DRAWINGS

Other objects and advantages of the invention will become apparent upon reading the detailed description and upon reference to the accompanying drawings, in which:

FIG. 3 is a rear elevation of the watering container and fertilizer container of FIG. 1, FIG. 4 is a side elevation of the fertilizer container of FIG. 1 removed from the watering container;

FIG. 5 is an exploded end elevation of the fertilizer container of FIG. 4;

FIG. 6 is a top plan view of the fertilizer container of FIGS. 4 and 5;

FIG. 7 is a side elevation of a removable sprinkler head for use on the watering container of FIGS. 1–3; and FIG. 8 is an end elevation of the sprinkler head of FIG. 7.

DETAILED DESCRIPTION OF ILLUSTRATIVE EMBODIMENTS

Figure 1:
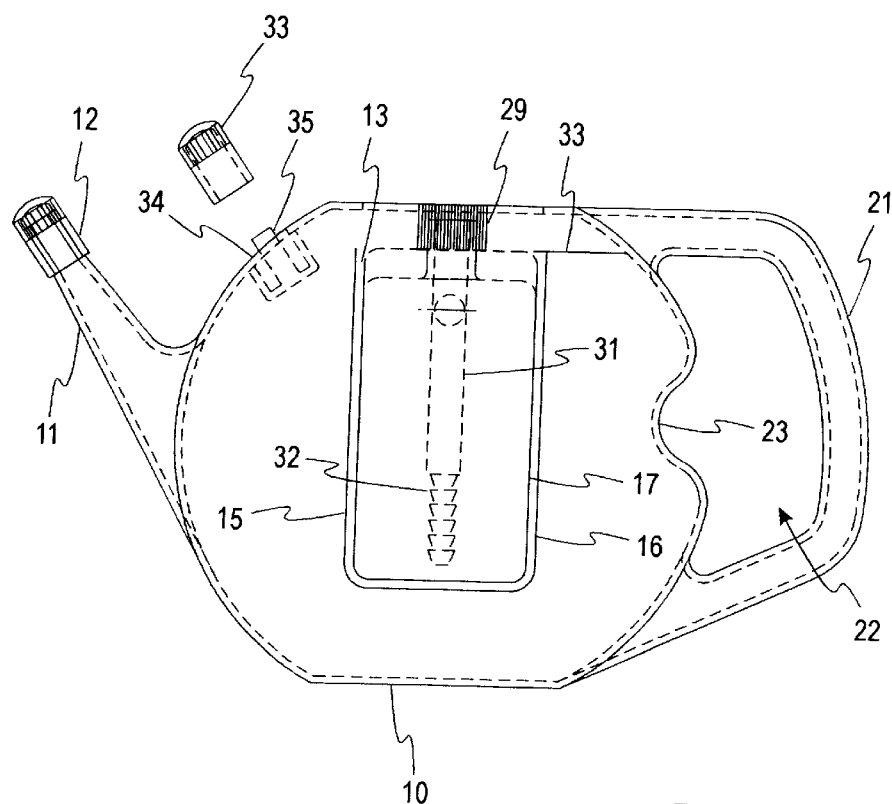
FIG. 1 is a side elevation of a watering container and fertilizer dispenser embodying the present invention.

Referring now to FIGS. 1–4, there is shown a side view of a watering container comprising a body 10 which is hollow for storing a liquid such as water or a water-fertilizer mixture. The liquid is applied to the plant through a hollow spout II which is connected to a sprinkler head 12. From the sprinkler head 12, the water or water-fertilizer mixture is applied to the plant.

The outer wall of the container body 10 forms a cavity 13 for holding a fertilizer container 14. The side walls 15 and 16 of the cavity 13 are spaced slightly farther apart adjacent the rear wall 17 of the cavity than at the front opening 18 of the cavity, and the fertilizer container 14 has a complementary shape (see FIGS. 2 and 6). Consequently, when the fertilizer container is inserted downwardly through the top opening of the cavity 13, it is held in place by the side walls 15 and 16 of the cavity. A detent formed by a button 19 on the rear wall of the container 14 and a mating recess 20 in the rear wall of the cavity 13 resist vertical movement of the container 14 after it has been fully seated in the cavity 13, and the user can feel the detent elements snap together as the container 14 is lowered into the cavity 13. The resistance offered by the detent can, of course, be easily overcome when the user manually pulls the container 14 out of the cavity 13.

The watering container also forms an integral handle 21 at the rear of the container and spaced an adequate distance from the body 10 to allow an averaged-sized hand to be fully inserted through the gap 22, thus allowing a hand to easily grip and hold the watering container. In addition, one or more depressions 23 are formed in the body 10 directly adjacent the handle 21 to facilitate gripping of the container body. By forming the container in this manner, the watering container, when tipped forward, facilitates the dispensing of water. While most watering containers require the bending forward of the wrist, this configuration allows tilting of the watering container by slight lifting of the arm. For persons with impaired use of the wrist (arthritis patients), this arm movement and minor finger movement makes the task of plant watering much easier.

As can be seen in FIG. 1, the watering container spout 11 is positioned at an angle of about 45° from vertical and has a small outlet 24 positioned to be no higher than the top of the watering container, to allow for controlled pouring of limited quantities of water in limited spaces.

FIGS. 4–6 illustrate the fertilizer container 14 detached from the watering container. It comprises a generally rectangular hollow body 25 to hold and dispense plant fertilizer and other materials beneficial to plants. The front wall 26 tapers inwardly toward the bottom of the container to match the curvature of the portion of the watering container body 10 that is directly adjacent the lower portion of the container 14 when it is inserted in the cavity 13. The side walls 27 and 28 of the container 14 taper slightly inwardly from back to front to match the taper of the side walls 15 and 16 of the cavity 13, so that the cavity and the container 14 are complementary.

The container is closed by a removable cap 29 having internal threads that mate with external threads on a neck 30 on the top of the container 14. Depending from the cap 29 is a stem 31 having a reduced-diameter, serrated lower end portion 32 that functions as a self-measuring dispensing system for the fertilizer or other material in the container 14. The composition of the fertilizer or other material in the container 14 is viscous in nature. Because of this viscosity, the material will stick to the serrated portion 32 of the stem 31 as it is removed from the fertilizer container 14.

The inside diameter of the neck 30 is approximately the same size as the outside diameter of the upper portion of the stem 31. Thus, when the stem 31 is removed from the container 14, there is be no space for the viscous material to remain attached to the stem 31. The viscous material is thus wiped from the entire stem 31, except the serrated lower portion 32, which carries a predetermined amount of the viscous material. The removed stem 31 is then immersed in the liquid in the watering container and moved back and forth so that the attached viscous material on the stem is dissolved or dispersed in the liquid. The length and shape of the serrated end portion may be varied depending on the amount of material that is desired to be dispense.

The watering container is preferably filled with water before removing the cap 29 and stem 31 used to dispense the proper amount of fertilizer composition. The proper amount of water for the amount of fertilizer composition normally carried by the serrated stem 31 is indicated by a fill-level indicator 33 molded into the container body 10. After removal of the cap and stem from the fertilizer container, the stem is lowered into the water and swirled around until the fertilizer composition is thoroughly dispersed in the water.

Figure 2:
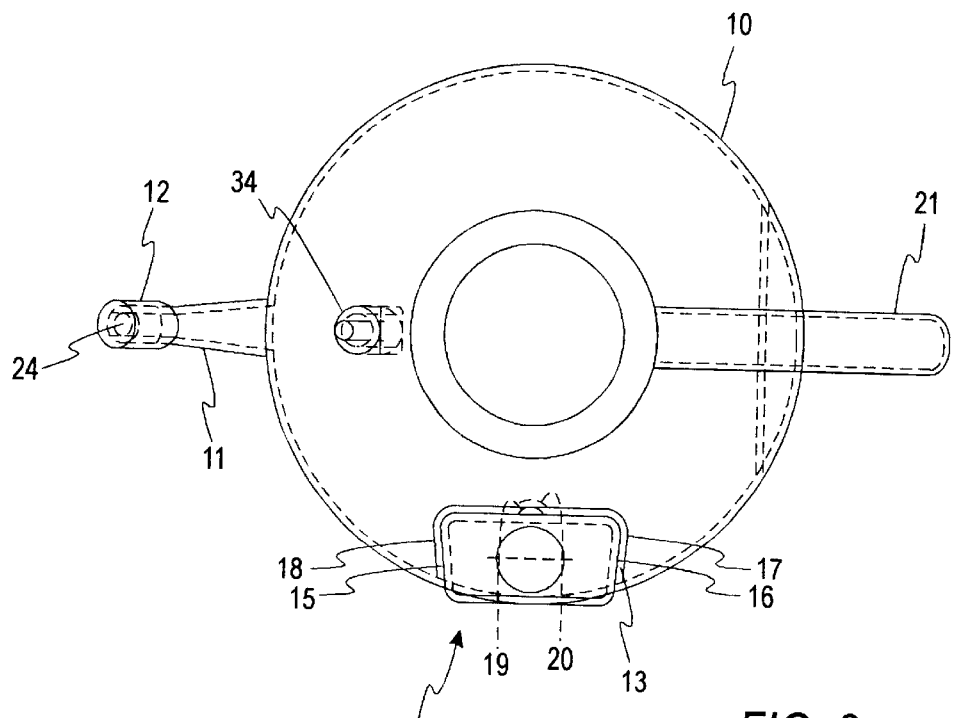
FIG. 2 is a top plan view of the watering container and fertilizer container of FIG. 1.

FIGS. 7 and 8 illustrate a removable sprinkler head 12 for use on the watering container of FIGS. 1–3. To permit the sprinkler head 12 to be stored directly on the watering container, so that it is always conveniently available to the user, a receptacle 34 is formed in the container body 10 adjacent the spout 11. This receptacle 34 accommodates the sprinkler head 12 when it is not in use. The receptacle has an upward protruding post 35 that fits snugly inside the sprinkler head 12. When the sprinkler head 12 is inserted into the receptacle 34, the sprinkler head 12 will snap onto the post 35, thereby locking it in place. When the sprinkler head 12 is to be used, it can be easily removed and placed on the end of the spout 11, which has the same diameter as the post 35 so that the sprinkler head will fit in either place.

The aqueous fertilizer composition used in this invention is preferably formulated to offer the following benefits:

1. Long-term storage stability.
2. Clarity of the finished product.
3. Biodegradability.
4. Thixotropic viscosity characteristics.
5. Ease of dilution in water.
6. Ease in manufacturing.
7. Good penetration and wetting properties.

It has been found that xanthan gum, a versatile polysaccharide, is a preferred thickener and stabilizer for an aqueous fertilizer composition containing micronutrients such as metal salts, e.g., salts of zinc, copper, iron, etc. One suitable xanthan gum is "VANZAN NF-C" manufactured by R.T. Vanderbilt Company. This thickener is particularly suitable in an aqueous system with high electrolyte content such as fertilizers in liquid form. One of the major advantages of using the xanthan gum is that it can be post added, which makes the viscosity adjustment easy. Other ingredients can also be post added.

Many other substances useful as thickeners are known in the art, including natural polymers such as casein and alginates, and synthetic materials such as modified acrylic and polyurethane polymers and also cellulose derivatives.

One suitable liquid fertilizer is a mixture of monoammonium phosphate, urea, potassium phosphate and potassium chloride dissolved in water to arrive at a desired combination of N-P-K values depending on the type of plant being fertilized. The composition also preferably includes a surfactant to improve soil penetration and wetting, and a preservative. The preferred anionic surfactant is a low foam product from Stephan Chemicals, "Bioterge PAS-8." The preferred preservative is "Kathon LX 1.5."

The ingredients of the fertilizer composition preferably fall within the following ranges.

| Raw Material | Weight % |
| --- | --- |
| Pre-blended Liquid Fertilizer | 99–100 |
| VANZAN NF-C | 0.4–0.6 |
| Preservative | 0.05–0.1 |
| Anionic Surfactant | 0.5–1.0 |

A particularly preferred composition is the following:

| Premix Liquid Fertilizer (7-7-7) | Weight % |
| --- | --- |
| Micro nutrients | 98.80 |
| VANZAN NF-C | 0.65 |

-continued

| Premix Liquid Fertilizer (7-7-7) | Weight % |
|---|---|
| Kathon LX 1.5 | 0.05 |
| Bioterge PAS 8 | 0.50 |
| TOTAL | 100.00 |

Viscosity #2/6 RPM 1200 cps

Pounds per Gallon 10.00

While the present invention has been described with reference to one or more embodiments, those skilled in the art will recognize that many changes may be made there to without departing from the spirit and scope of the present invention. Each of these embodiments and obvious variations thereof are contemplated as falling within the spirit and scope of the claimed invention, which is set forth in the following claims.

What is claimed is:

1. A water container comprising:
   a hollow watering container for holding a liquid, said container forming a spout, a handle and a side cavity in the exterior surface of the container;
   an auxiliary container fitting into said side cavity for holding a viscous material beneficial to plants, said auxiliary container comprising a hollow container with an opening, and a removable cap for closing said opening, and
   means for releasably retaining said auxiliary container in said side cavity in the exterior surface of said watering container,
   said cap of said auxiliary container including a stem having an upper portion having a diameter approximately the same as the diameter of the opening of said auxiliary container, and a serrated lower portion for carrying said viscous fertilizer thereon.

2. The water container of claim 1 wherein the mating surfaces of said cavity and said auxiliary container form a detent that resists removal of said auxiliary container from said cavity.

3. The water container of claim 1 wherein the mating surfaces of said cavity and said auxiliary container prevent removal of said auxiliary container from said cavity except in a vertical direction.

4. The water container of claim 1 wherein said watering container forms a receptacle for holding a sprinkler head.

5. The water container of claim 1 wherein said auxiliary container contains a viscous aqueous composition including xanthan gum as a thickener and stabilizer.

6. A method of mixing and dispensing water and a material beneficial to plants, said method comprising:
   providing a hollow watering container forming a spout, a handle and a side cavity in the exterior surface of the container;
   placing an auxiliary container into said side cavity, said auxiliary container comprising a hollow container containing a viscous material beneficial to plants and releasably retained in said side cavity in said exterior surface of said watering container, said auxiliary container forming an opening closed by a cap having a depending stem shaped to retain a predetermined amount of said viscous material; and
   filling said watering container with water, manually removing said cap from said auxiliary container, dispensing at least a portion of said viscous material from said auxiliary container into the water in said watering container, and replacing the removed cap on said auxiliary container.

7. The method of claim 6 wherein said viscous aqueous composition contains xanthan gum as a thickener and stabilizer.

8. A method of mixing and dispensing water and a fertilizer, said method comprising:
   providing a hollow watering container forming a spout, a handle and a side cavity in the exterior surface of the container;
   placing a fertilizer container into said side cavity, said fertilizer container comprising a hollow container containing a viscous aqueous fertilizer composition and releasably retained in said side cavity in said exterior surface of said watering container, said fertilizer container forming an opening closed by a cap with a stem having an upper portion with a diameter approximately the same as the diameter of said opening, and a serrated lower portion for carrying a portion of said viscous aqueous composition thereon; and
   filling said watering container with water, manually removing said cap from said auxiliary container, dispensing a portion of said viscous material from said auxiliary container into the water in said watering container, and replacing the removed cap on said auxiliary container.

9. A method for dispensing water and a fertilizer comprising the steps of:
   providing a watering container with a side cavity;
   fitting a fertilizer holder in said side depression
   providing a cap with an elongated ridged finger element for said fertilizer holder;
   adding fertilizer to said fertilizer holder;
   inserting said cap into said fertilizer holder;
   removing said cap from said fertilizer holder and allowing said ridged finger element to retain some of said fertilizer;
   adding water to said watering container;
   inserting said ridged finger element into said watering container;
   mixing said fertilizer and water to form a water-fertilizer mixture; and
   dispensing said mixture to plants.

10. The method of claim 9 wherein said cavity of the watering container forms two ridges.

11. The method of claim 9 wherein the cavity of said water container contains a depression, said fertilizer holder forms a protrusion, said depression formed inside as to mate with said protrusion on said fertilizer container.

12. The method of claim 9 further comprising the step of providing a handle formed as a part of said water container, said handle positioned opposite said spout and separated from said water container by a distance that allows for the insertion of a hand and the convenient placement and positioning of all fingers.

13. A water and fertilizer dispenser comprising:
   water container means for holding a liquid, said container having a side cavity;
   fertilizer container means for holding fertilizer, said fertilizer container means fitting into said side cavity, said fertilizer container comprising a hollow container with an opening, a cap coupling to said opening, and a serrated stem coupled to said cap, spout means coupled to said water container for dispensing said liquid, and a handle coupled to said water container means.

14. The water and fertilizer dispenser of claim 13 wherein the cavity of said water container means and said fertilizer dispenser means have mating surfaces that form a detent.

15. The water and fertilizer dispenser of claim 13 wherein said cavity of the watering container is shaped to permit relative movement between said containers only in the vertical direction.

16. The water and fertilizer dispenser of claim 13 wherein said handle is positioned opposite said spout and separated from said water container by a distance that allows for the insertion of a hand and the convenient placement and positioning of all fingers.

* * * * *